(12) United States Patent
Powell et al.

(10) Patent No.: US 6,787,592 B1
(45) Date of Patent: Sep. 7, 2004

(54) ORGANOCLAY COMPOSITIONS PREPARED FROM ESTER QUATS AND COMPOSITES BASED ON THE COMPOSITIONS

(75) Inventors: Clois E. Powell, Seguin, TX (US); James F. Gadberry, Danbury, CT (US); Michael Hoey, Woodbridge, NJ (US)

(73) Assignee: Southern Clay Products, Inc., Gonzales, TX (US)

( * ) Notice: Subject to any disclaimer, the term of this patent is extended or adjusted under 35 U.S.C. 154(b) by 0 days.

(21) Appl. No.: 09/422,154

(22) Filed: Oct. 21, 1999

(51) Int. Cl.[7] .................................................. C08J 3/02
(52) U.S. Cl. ...................... 524/445; 524/447; 524/186; 501/145; 501/146
(58) Field of Search .............................. 524/444, 789, 524/447, 445, 186; 501/145, 146, 148, 127, 141

(56) References Cited

U.S. PATENT DOCUMENTS

| | | |
|---|---|---|
| 2,367,384 A | 1/1945 | Tymstra et al. |
| 2,531,396 A | 11/1950 | Carter et al. |
| 2,531,427 A | 11/1950 | Hauser |
| 2,531,440 A | 11/1950 | Jordan |
| 2,531,812 A | 11/1950 | Hauser |
| 2,552,775 A | 5/1951 | Fischer et al. |
| 2,622,987 A | 12/1952 | Ratcliffe |
| 2,658,869 A | 11/1953 | Stross et al. |
| 2,739,067 A | 3/1956 | Racliffe |
| 2,750,296 A | 6/1956 | Curado et al. |
| 2,754,219 A | 7/1956 | Voet et al. |
| 2,767,177 A | 10/1956 | Erickson |
| 2,795,545 A | 6/1957 | Gluesenkamp |
| 2,883,356 A | 4/1959 | Gluesenkamp |
| 2,885,360 A | 5/1959 | Haden, Jr. et al. |
| 2,966,506 A | 12/1960 | Jordan |
| 3,027,322 A | 3/1962 | Stuchell et al. |
| 3,084,117 A | 4/1963 | Nahin et al. |
| 3,125,547 A | 3/1964 | Blatz |
| 3,227,675 A | 1/1966 | Papalos |
| 3,252,757 A | 5/1966 | Granquist |
| 3,290,165 A | 12/1966 | Iannicelli |
| 3,471,439 A | 10/1969 | Bixler et al. |
| 3,509,066 A | 4/1970 | Jacobs et al. |
| 3,537,994 A | 11/1970 | House |
| 3,567,680 A | 3/1971 | Iannicelli |
| 3,573,944 A | 4/1971 | Gebura |
| 3,666,407 A | 5/1972 | Orlemann |
| 3,671,190 A | 6/1972 | Neumann |
| 3,687,846 A | 8/1972 | Lang |
| 3,691,070 A | 9/1972 | Pippen |
| 3,764,456 A | 10/1973 | Woodhams |
| 3,804,656 A | 4/1974 | Kaliski et al. |
| 3,839,389 A | 10/1974 | Neuman |
| 3,843,591 A | 10/1974 | Hedrick et al. |
| 3,844,978 A | 10/1974 | Hickson |
| 3,844,979 A | 10/1974 | Hickson |
| 3,852,405 A | 12/1974 | Granquist |
| 3,855,147 A | 12/1974 | Granquist |
| 3,915,867 A | 10/1975 | Kang et al. |
| 3,951,850 A | 4/1976 | Clocker et al. |
| 3,974,125 A | 8/1976 | Oswald et al. |
| 3,977,894 A | 8/1976 | White et al. |
| 3,988,287 A | 10/1976 | Inokuchi et al. |
| 4,033,764 A | 7/1977 | Colegate et al. |
| 4,033,893 A | 7/1977 | Mondshine |
| 4,040,974 A | 8/1977 | Wright et al. |
| 4,060,518 A | 11/1977 | Jeserich et al. |
| 4,081,496 A | 3/1978 | Finlayson |
| 4,087,365 A | 5/1978 | Clem |
| 4,105,578 A | 8/1978 | Finlayson et al. |
| 4,116,866 A | 9/1978 | Finlayson |
| 4,190,686 A | 2/1980 | Muis |
| 4,216,135 A | 8/1980 | Finlayson |
| 4,216,188 A | 8/1980 | Shabrai et al. |
| 4,240,951 A | 12/1980 | Moll, Jr. et al. |
| 4,251,576 A | 2/1981 | Osborn et al. |
| 4,290,935 A | 9/1981 | Muraki |

(List continued on next page.)

FOREIGN PATENT DOCUMENTS

| | | |
|---|---|---|
| DE | 3 434 983 | 9/1984 |
| DE | 19 726 278 | 6/1997 |
| EP | 0 221 225 | 5/1987 |

(List continued on next page.)

OTHER PUBLICATIONS

Plueddemann et al., "Surface Treatments of Industrial Minerals for Polymer Composites," 1989, pp. 1–19.

"Silane Chemistry Primer," © Dow Corning Corporation, 4 pgs.

Onikata et al., "Rheological Properties of the Partially Hydrophobic Montmorillonite Treated with Alkyltrialkoxysilane," 1995, pp. 299–310.

(List continued on next page.)

*Primary Examiner*—Katarzyna Wyrozebski
(74) *Attorney, Agent, or Firm*—Meyertons, Hood, Kivlin, Kowert & Goetzel, P.C.; Eric B. Meyertons

(57) ABSTRACT

Organoclays based on specific types of ester quats are found to be remarkably effective for use in preparing nanocomposites. These organoclays comprise the reaction product of a smectite clay and a quaternary ammonium compound (or "quat") which comprises two esterified radicals hereinafter called a "diester quat"). The diester quat may be present in admixture with further quaternary ammonium compounds having esterified radicals, especially compounds having three esterified radicals (hereinafter "triester quats"); or compounds having a single esterified radical (hereinafter "monoester quats"). Where such a mixture of quats is used, the reaction is between the smectite clay and the quat mixture. The diester quat should be present as greater than 55 wt % of the quaternary mixture; and any triester quat should be less than 25 wt %, with the fatty acids corresponding to the esters in the mixture having a degree of unsaturation such that the iodine value ("IV") is from about 20 to about 90.

60 Claims, 6 Drawing Sheets

U.S. PATENT DOCUMENTS

| | | | |
|---|---|---|---|
| 4,291,154 | A | 9/1981 | Blount |
| 4,314,919 | A | 2/1982 | Washabaugh et al. |
| 4,314,929 | A | 2/1982 | Mahoney, Jr. |
| 4,339,391 | A | 7/1982 | Hoffmann et al. |
| 4,341,565 | A | 7/1982 | Martenson |
| 4,349,389 | A | 9/1982 | Schofield |
| 4,365,030 | A | 12/1982 | Oswald et al. |
| 4,382,868 | A | 5/1983 | House |
| 4,386,010 | A | 5/1983 | Hildebrandt |
| 4,391,637 | A | 7/1983 | Mardis et al. |
| 4,410,364 | A | 10/1983 | Finlayson et al. |
| 4,412,018 | A | 10/1983 | Finlayson et al. |
| 4,431,755 | A | 2/1984 | Weber et al. |
| 4,434,075 | A | 2/1984 | Mardis et al. |
| 4,434,076 | A | 2/1984 | Mardis et al. |
| 4,444,714 | A | 4/1984 | Martenson |
| 4,450,095 | A | 5/1984 | Finlayson |
| 4,454,237 | A | 6/1984 | Hoda et al. |
| 4,455,382 | A | 6/1984 | Wu |
| 4,462,470 | A | 7/1984 | Alexander et al. |
| 4,464,274 | A | 8/1984 | House |
| 4,465,542 | A | 8/1984 | Furihata |
| 4,470,912 | A | 9/1984 | Bea |
| 4,472,538 | A | 9/1984 | Kamigaito et al. |
| 4,473,477 | A | 9/1984 | Beall |
| 4,473,675 | A | 9/1984 | Knudson, Jr. et al. |
| 4,480,060 | A | 10/1984 | Hoda et al. |
| 4,500,668 | A | 2/1985 | Shimizu et al. |
| 4,508,628 | A | 4/1985 | Walker et al. |
| 4,517,094 | A | 5/1985 | Beall |
| 4,528,104 | A | 7/1985 | House et al. |
| 4,528,304 | A | 7/1985 | Yoshimura et al. |
| 4,552,712 | A | 11/1985 | Ramamurthy |
| 4,558,075 | A | 12/1985 | Suss et al. |
| 4,569,923 | A | 2/1986 | Knudson, Jr. et al. |
| 4,600,515 | A | 7/1986 | Gleason et al. |
| 4,620,993 | A | 11/1986 | Suss et al. |
| 4,623,398 | A | 11/1986 | Goodman et al. |
| 4,631,091 | A | 12/1986 | Goodman |
| 4,640,716 | A | 2/1987 | Cleland |
| 4,659,760 | A | 4/1987 | van der Meer |
| 4,664,842 | A | 5/1987 | Knudson, Jr. et al. |
| 4,690,868 | A | 9/1987 | Rice |
| 4,695,402 | A | 9/1987 | Finlayson et al. |
| 4,724,098 | A | 2/1988 | Kalz et al. |
| 4,739,007 | A | 4/1988 | Okada et al. |
| 4,743,305 | A | 5/1988 | Doidge et al. |
| 4,743,306 | A | 5/1988 | Jepson et al. |
| 4,753,974 | A | 6/1988 | Goodman et al. |
| 4,775,586 | A | 10/1988 | Bohrn et al. |
| 4,786,558 | A | 11/1988 | Sumiya et al. |
| 4,789,403 | A | 12/1988 | Rice |
| 4,804,703 | A | 2/1989 | Subramanian |
| 4,810,734 | A | 3/1989 | Kawasumi et al. |
| 4,830,843 | A | 5/1989 | Usui et al. |
| 4,876,030 | A | 10/1989 | Dixon et al. |
| 4,889,885 | A | 12/1989 | Usuki et al. |
| 4,990,405 | A | 2/1991 | Bohrn et al. |
| 5,061,744 | A | 10/1991 | Ogitani et al. |
| 5,089,200 | A | 2/1992 | Chapman, Jr. et al. |
| 5,102,948 | A | 4/1992 | Deguchi et al. |
| 5,110,501 | A | 5/1992 | Knudson, Jr. et al. |
| 5,114,895 | A | 5/1992 | Holmgren et al. |
| 5,151,155 | A | 9/1992 | Cody et al. |
| 5,160,454 | A | 11/1992 | Knudson, Jr. et al. |
| 5,164,433 | A | 11/1992 | Ricci et al. |
| 5,164,440 | A | 11/1992 | Deguchi et al. |
| 5,164,460 | A | 11/1992 | Yano et al. |
| 5,188,064 | A | 2/1993 | House |
| 5,248,641 | A | 9/1993 | Bauer et al. |
| 5,248,720 | A | 9/1993 | Deguchi et al. |
| 5,310,775 | A | 5/1994 | Sibilia et al. |
| 5,328,590 | A | 7/1994 | Occelli |
| 5,334,241 | A | 8/1994 | Jordan |
| 5,376,604 | A | 12/1994 | Iwaski et al. |
| 5,385,776 | A | 1/1995 | Maxfield et al. |
| 5,391,228 | A | 2/1995 | Carrol |
| 5,429,999 | A * | 7/1995 | Nae et al. .................. 501/146 |
| 5,464,472 | A | 11/1995 | Horn et al. |
| 5,514,734 | A | 5/1996 | Maxfield et al. |
| 5,552,469 | A | 9/1996 | Beall et al. |
| 5,554,670 | A | 9/1996 | Giannelis et al. |
| 5,574,179 | A | 11/1996 | Wahl et al. |
| 5,576,257 | A | 11/1996 | Jordan |
| 5,578,672 | A | 11/1996 | Beall et al. |
| 5,616,286 | A | 4/1997 | Jordan |
| 5,663,111 | A | 9/1997 | Gadberry et al. |
| 5,700,319 | A | 12/1997 | Bauer et al. |
| 5,718,841 | A * | 2/1998 | Mardis et al. .............. 252/309 |
| 5,728,764 | A | 3/1998 | Bauer et al. |
| 5,735,943 | A | 4/1998 | Cody et al. |
| 5,739,087 | A | 4/1998 | Dennis |
| 5,780,376 | A | 7/1998 | Gonzales et al. |
| 5,785,749 | A | 7/1998 | Knesek et al. |
| 5,786,417 | A | 7/1998 | Ogawa et al. |
| 5,837,654 | A | 11/1998 | Carroll et al. |
| 5,843,862 | A | 12/1998 | Bhattacharyya |
| 5,882,662 | A | 3/1999 | Pahlck et al. |
| 5,883,173 | A | 3/1999 | Elspass et al. |
| 5,900,309 | A | 5/1999 | Kitamura et al. |
| 5,916,863 | A | 6/1999 | Iacobucci et al. |
| 5,955,535 | A | 9/1999 | Vaia et al. |
| 5,962,553 | A | 10/1999 | Ellsworth |
| 5,969,029 | A | 10/1999 | Kotani et al. |
| 5,989,331 | A | 11/1999 | Bauer et al. |
| 6,025,295 | A | 2/2000 | Tanielyan et al. |
| 6,025,303 | A | 2/2000 | Keilhofer et al. |
| 6,034,163 | A | 3/2000 | Barbee et al. |
| 6,036,765 | A | 3/2000 | Farrow et al. |
| 6,037,315 | A * | 3/2000 | Franklin et al. ............ 510/123 |
| 6,060,549 | A | 5/2000 | Li et al. |
| 6,074,474 | A | 6/2000 | Broome et al. |
| 6,084,019 | A | 7/2000 | Matayabas, Jr. et al. |
| 6,087,016 | A | 7/2000 | Feeney et al. |
| 6,113,891 | A | 9/2000 | Burdick et al. |
| 6,123,962 | A | 9/2000 | Makino et al. |
| 6,124,245 | A | 9/2000 | Patel |
| 6,162,857 | A | 12/2000 | Trexler, Jr. et al. |
| 6,221,831 | B1 | 4/2001 | Emery et al. |
| 6,225,374 | B1 | 5/2001 | Vaia et al. |
| 6,287,634 | B1 * | 9/2001 | Beal et al. .................. 427/220 |
| 6,287,992 | B1 | 9/2001 | Polansky et al. |
| 6,380,295 | B1 * | 4/2002 | Ross et al. .................. 524/443 |
| 6,407,155 | B1 * | 6/2002 | Qian et al. .................. 524/445 |

FOREIGN PATENT DOCUMENTS

| | | |
|---|---|---|
| EP | 0 315 987 | 5/1989 |
| EP | 0 204 240 | 5/1990 |
| EP | 0 787 767 | 8/1997 |
| EP | 0 798 267 | 10/1997 |
| EP | 952187 * | 5/1999 |
| EP | 0 952 187 | 10/1999 |
| GB | 1439828 | 6/1976 |
| GB | 2 158 053 | 11/1985 |
| JP | 62-252426 | 11/1987 |
| JP | 06-172741 | 6/1994 |
| JP | 07-207134 | 8/1995 |
| JP | 07-228762 | 8/1995 |
| JP | 08-012881 | 1/1996 |
| JP | 08-053572 | 2/1996 |
| JP | 08-259846 | 10/1996 |

| | | |
|---|---|---|
| JP | 09-067521 | 3/1997 |
| JP | 09-087096 | 3/1997 |
| JP | 09-132695 | 5/1997 |
| JP | 09-175817 | 7/1997 |
| JP | 09-194724 | 7/1997 |
| JP | 09-202843 | 8/1997 |
| JP | 09-225991 | 9/1997 |
| JP | 09-227778 | 9/1997 |
| JP | 10 0817585 | 3/1998 |
| JP | 11 071509 | 3/1999 |
| WO | 83/01208 | 4/1983 |
| WO | WO-93/04117 A * | 3/1993 |
| WO | 93/04118 | 3/1993 |
| WO | 93/11069 | 6/1993 |
| WO | 97/00910 | 1/1997 |
| WO | 97/17398 | 5/1997 |
| WO | 97/27155 | 7/1997 |
| WO | 97/30950 | 8/1997 |
| WO | 97/42279 | 11/1997 |
| WO | 98/53000 | 11/1998 |
| WO | 98/56598 | 12/1998 |
| WO | 98/56861 | 12/1998 |

OTHER PUBLICATIONS

Wanner et al., "The Acid/Base Chemistry of Montmorillonite," 1994, pp. 733–738.

Murphy, "Reinforced and Filled Thermoplastics," 1966, pp. 41–49.

Zisman, "Improving the Performance of Reinforced Plastics," 1965, pp. 26–34.

Dannenberg, "The Effects of Surface Chemical Interactions on the Properties of Filler–Reinforced Rubbers," pp. 410–444.

Jones et al., "Sepiolite and Palygorskite," pp. 631–674.

"Drilling Problems Related to Drilling Fluids," 1988, pp. 463–464, 559–562.

Cowan et al., "Adsoprtion by Organo–Clay Complexes,", Peragamon Press Ltd., Swineford, A., *Ninth National Conference on Clays and Clay Minerals* 1960, 9, 459–467.

Cowan et al., "Adsoprtion by Organo–Clay Complexes–Part 2", Pergamon Press Inc., *Symposium on Bentonites and Texas Uranium Deposits*, 1963, pp.226–235.

Fischer, E. K. Rheological Properties of Dispersions Colloidal Dispersions, J. Wiley & Sons LTD., 1950, pp. 147–172.

Granquist, W. T. and Pollack, S. S. "A Study of the Synthesis of Hectorite," Proceedings 8th National Conference on Clays and Clay Minerals, vol. 8, pp. 150–169.

Searle et al., "Chemistry and Physics of Clays and Other Ceramic Materials" 3rd Edition, p. 462–464.

Want et al., "Clay–Polymer Nanocomposites formed from Acidic Derivatives of Montmorillonite and an Epoxy Resin" *Chemistry of Materials*, 1994, 6, pp. 468–474.

Wang et al., "PVC–Clay Nanocomposites Preparation Thermal and Mechanical Properties," *Polymer Preprints*, 2001, p. 842–843.

* cited by examiner

# ORGANOCLAY COMPOSITIONS PREPARED FROM ESTER QUATS AND COMPOSITES BASED ON THE COMPOSITIONS

FIELD OF THE INVENTION

This invention relates generally to organophilic clays (hereinafter referred to as "organoclays"), and more specifically relates to organoclays prepared from smectite clays which have been treated with a quaternary ammonium compound of a type commonly referred to as an ester quat. Such ester quats are derived from alkanolamine compounds whose hydroxyl groups are at least partially esterified with carboxylic acids to form a molecule with significant oleophilic properties. The resultant organoclays are useful as functional additives for organic based systems, where they may confer desired mechanical or physical properties sought for such systems.

BACKGROUND OF THE INVENTION

Organoclays represent the reaction product of a smectite-type clay with a higher alkyl containing ammonium compound (often a quaternary), and have long been known for use in gelling of organic liquids such as lubricating oils, linseed oil, toluene and the like and for use as theological additives in a variety of organic based liquid systems and solvents. The general procedures and chemical reactions pursuant to which these organoclays are prepared are well known. Thus under appropriate conditions the organic compound which contains a cation will react by ion exchange with clays which contain a negative layer lattice and exchangeable cations to form the organoclay products. If the organic cation contains at least one alkyl group containing at least ten carbon atoms then the resultant organoclays will have the property of swelling in certain organic liquids. Among the further prior art patents, which discuss at length aspects of the preparation and properties of organoclays are U.S. Pat. Nos. 2,531,427; 2,966,506; 3,974,125; 3,537,994; and 4,081,496.

As utilized in the present specification, the term "smectite" or "smectite-type clays" refers to the general class of clay minerals with expanding crystal lattices, with the exception of vermiculite. This includes the dioctahedral smectites which consist of montmorillonite, beidellite, and nontronite, and the trioctahedral smectites, which include saponite, hectorite, and sauconite. Also encompassed are smectite-clays prepared synthetically, e.g. by hydrothermal processes as disclosed in U.S. Pat. Nos. 3,252,757; 3,586,468; 3,666,407; 3,671,190; 3,844,978; 3,844,979; 3,852,405; and 3,855,147.

In addition to their function as thixotropes, organoclays find numerous other applications. Of particular interest for present purposes are composite materials composed of an organic polymer and a smectite-type clay mineral, with the mineral being coupled to the polymer through ionic or other bonding. Prior art pertinent to such composites include U.S. Pat. No. 2,531,3963, published Nov. 28, 1950, wherein a reinforced elastomer is disclosed. Smectite clays such as bentonite and hectorite are base exchanged with organic amines or salts thereof such as triethanolamine hydrochloride. Quaternary ammonium compounds can also be used. The resulting compounds, which are therefore "organoclays", are added to the lattices of elastomers. The organoclays can be added to the latex of any elastomer including natural rubber, and a large list of polymers and/or copolymers is provided. The resulting compositions can be vulcanized.

Japan Laid Open Application S51(76)-109998, deriving from application SHO 50(1975)-3580 was published Sept. 29, 1976, and is entitled "Method for Manufacturing a Clay-Polyamide Composite". It discloses a method for manufacturing a clay-polyamide composite characterized by carrying out the polymerization of lactam in the presence of an organoclay made by carrying out ion exchange to bond an organic compound which contains at least one amino group and has the catalyst effect of polymerizing the lactam and clay. The organic compounds mentioned include omega-aminocapronic acid, a nylon salt, hexamethylenediamine, and aminodecanoic acid. The lactams include epsiloncaprolactam and others such as omega-enantolactam, omega-capryllactam, and omegalaurolactam. The clays used include the montmorillonite group of clay minerals such as montmorillonite, hectorite, etc; and other clays are listed. Montmorillonite is preferred because of the high exchange capacity. The composite is made by first ion exchanging the clay with the organic compound under aqueous conditions, after which the which the suspension is washed, filtered and dried, then crushed. (This is essentially the conventional procedure for preparing an organoclay.) The "organoclay" and lactam are mixed, with the organoclay being 10 to 75 wt % of the mixture. During mixing the mixture is brought to 80–100 deg C. to melt the lactam. Polymerization is carried out at 240 to 260 deg C. In the resulting composite product it is stated that the silicate layer has a thickness of 9.6 Angstroms. In a first example the interlayer distance of the organoclay layers before polymerization was 3.4 Angstroms, and 13.1 Angstroms after 10 polymerization. In Example 4 the interlayer distance was 6.5 Angstroms before polymerization, and 50.6 Angstroms after polymerization. The composite produced is stated to have good fire-retardant properties, and improved mechanical properties.

Similarly, in Kawasumi et al., U.S. Pat. No. 4,810,734 a process is disclosed wherein a smectite-type clay mineral is contacted with a swelling agent in the presence of a dispersion medium thereby forming a complex. The complex containing the dispersion medium is mixed with a monomer, and the monomer is then polymerized. The patent states that the swelling agent acts to expand the interlayer distance of the clay mineral, thereby permitting the clay mineral to take monomers into the interlayer space. The swelling agent is a compound having an onium ion and a functional ion capable of reacting and bonding with a polymer compound. Among the polymers utilizable are Polyamide resins, vinyl polymers, thermosetting resins, polyester resins, polyamide resins and the like. Related disclosures are found in U.S. Pat. Nos. 4,739,007 and 4,889,885.

In recent years the clay-polymer composite materials above discussed have been referred to as "nanocomposites", a term which reflects their property of exhibiting ultrafine phase dimensions, typically in the range 1–100 nm. The number of nanocomposites based on smectite-type clays and linear thermoplastics is growing. Wang and Pinnavaia, e.g., have reported delamination of an organically modified smectite in an epoxy resin by heating an onium ion exchanged form of montmorillonite with epoxy resin to temperatures of 200–300° C. Chemistry of Materials, vol. 6, pages 468474 (April, 1994). Similarly, in U.S. Pat. No. 5,554,670 an epoxy-silicate nanocomposite is disclosed which is prepared by dispersing an organically modified smectite-type clay in an epoxy resin together with diglycidyl ether of bisphenol-A (DGEBA), and curing in the presence of either nadic methyl anhydride (NMA), and/or benzyldimethyl amine (BDMA), and/or boron trifluoride monoethylamine (BTFA) at 100–200° C. Molecular dispersion of the layered silicate within the crosslinked epoxy matrix is obtained, with smectite layer spacings of 100 Å or more and good wetting of the silicate surface by the epoxy matrix. Additional recent references evidencing the increasing interest in nanocomposites incorporating organoclays in polymer matrices include U.S. Pat. Nos. 5,164,440; 5,385,776; 5,552,469; and 5,578,672.

Thus in a typical procedure for preparing a nanocomposite, the smectite clay, most commonly a montmorillonite, is treated with an organic ammonium ion to intercalate the organic molecule between the silicate layers of the clay, thereby substantially swelling or expanding the interlayer spacing of the smectite (The reaction product resulting from this treatment may in accordance with the foregoing discussion, be referred to herein as an "organoclay". Thereafter the expanded silicate layers are separated or exfoliated in the presence of or with the assistance of a polymer with which groups on the intercalated organic molecule are compatible. A monomer can also be used which is polymerized after being intermixed with the intercalated clay.

SUMMARY OF THE INVENTION

Now in accordance with the present invention, it has unexpectedly been discovered that organoclays based on specific types of ester quataternary ammonium compounds, are remarkably effective for use in preparing nanocomposites. These organoclays comprise the reaction product of a smectite clay and a quaternary ammonium compound (hereinafter simply "quat") which comprises two esterified radicals (hereinafter called a "diester quat"). The diester quat may be present in admixture with further quaternary ammonium compounds having esterified radicals, especially compounds having three esterified radicals (hereinafter "triester quats"); or compounds having a single esterified radical (hereinafter "monoester quats"). Where such a mixture of quats is used, the reaction is between the smectite clay and the quat mixture. In an embodiment, the diester quat should be present as greater than 55 wt % of the quaternary mixture; and the triester quat should be less than 25 wt %, with the fatty acids corresponding to the esters in the mixture having a degree of unsaturation such that the iodine value ("IV") is from about 20 to about 90. In an embodiment, the diester quat content is greater than 60 wt %, the triester quat content is less than 20 wt %, and the IV is from about 30 to about 70. In other embodiments, the diester quat content is greater than 62%, the triester quat content is less than 17 wt %, and the IV is from about 40 to about 60. In some embodiments, an IV from about 45 to about 58 may be desired.

DETAILED DESCRIPTION OF THE INVENTION

Figure 1:
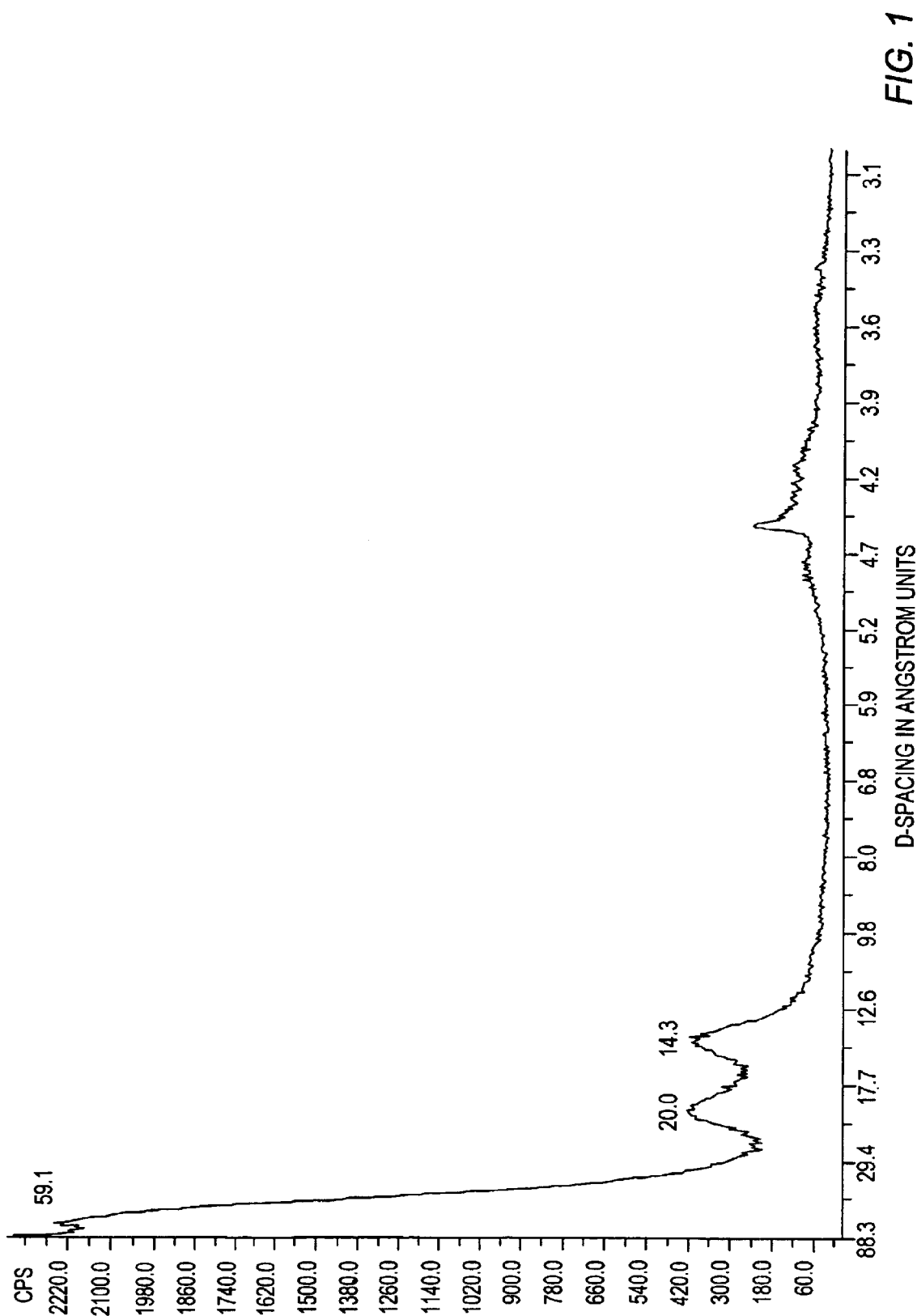
FIG. 1 is a wide angle X-ray scan pattern for an organoclay in accordance with the present invention.

The quaternary ammonium compounds which are reacted with the smectite clays to produce the organoclays of the present invention are high in diester and low in triester content. They are obtained by reaction of $C_{12}$ to $C_{22}$ fatty acids or the hydrogenation products thereof, or a mixture of such acids, with an alkanolamine in the presence of an acid catalyst, wherein the ratio of fatty acid to alkanolamine is from about 1.40 to 2.0. The resultant ester amine reaction products are subsequently quatemized to obtain quaternary ammonium salts for reaction with the smectite. In an embodiment, the fatty acid may be a $C_{16}$ to $C_{22}$ acid containing a degree of unsaturation such that the iodine value ("IV") is in the range of from about 3 to 90, in other embodiments, from about 20 to 90, in other embodiments, in the range of 40 to 60, and in other embodiments in the range of from about 45 to 55. Fatty acids include but are not limited to oleic, palmitic, erucic, eicosanic, and mixtures thereof. Soy, tallow, palm, palm kernel, rape seed, lard, mixtures thereof and the like are typical sources for fatty acid which may be employed.

In an embodiment, the fatty acid(s) employed may have a cis to trans isomer ratio of from about 80:20 to about 95:5. In an embodiment, the trans isomer content of said fatty acid(s) is less than about 10%. In an embodiment, the trans-isomer content is between about 0.5 to 9.9%. In an embodiment, the fatty acid is a mixture of tallow/distilled tallow having a cis:trans isomer ratio of greater than 9:1.

In an embodiment, alkanolamines may have the general formula:

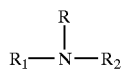

wherein R, $R_1$ and $R_2$ are independently selected from $C_2$ to $C_6$ hydroxyalkyl groups. Examples of alkanolamines include but are not limited to triethanolamine, propanol diethanolamine, ethanol diisopropanolamine, triisopropanol amine, diethanolisopropanol amine, diethanolisobutanolamine and mixtures thereof.

In an embodiment, the molar ratio of fatty acid to alkanolamine is generally in the range of from about 1.4 to 2.0, in other embodiments from about 1.55 to 1.90, in other embodiments from about 1.65 to 1.75 and in other embodiments from about 1.68 to 1.72. The acid catalyst employable in an embodiment includes, but is not limited to, acid catalysts such as sulphonic acid, phosphorous acid, p-toluene sulphonic acid, methane sulphonic acid, oxalic acid, hypophosphorous acid or an acceptable Lewis acid in an amount of 500 to 3000 ppm based on the amount of fatty acid charge. In an embodiment, an acid catalyst is hypophosphorous acid. In an embodiment, 0.02 to 0.2% by weight, and in other embodiments, 0.1 to 0.15% by weight of acid catalyst, based on the weight of fatty acid, may be employed.

The esterification of fatty acids with alkanolamines is carried out at a temperature of from about 170° to 250° C. until the reaction product has an acid value of below 5. After the esterification, the crude product is reacted with alkylating agents in order to obtain the quaternary ammonium product. Alkylating agents include $C_1$ to $C_3$ straight or branched chain alkyl halides, phosphates, carbonates, or sulfates, $C_7$ to $C_{10}$ aralkyl halides, phosphates or sulfates, and mixtures thereof. Examples of alkylating agents in an embodiment include, but are not limited to, methyl chloride, benzyl chloride, diethyl sulfate, dimethyl carbonate, trimethyl phosphate, dimethyl sulfate or mixtures thereof. Choosing the type and amount of alkylating agent employed is well within the skill of one in the art. In an embodiment, when dimethyl sulfate is the alkylating agent, 0.7 to 1.0 moles of dimethyl sulfate per mole of esteramine may be used. In other embodiments, 0.75 to 0.98 mol dimethyl sulfate per mole of esteramine may be used in yielding the quatemized product.

While such esterquats are typically prepared by reaction of the corresponding esteramine with dimethyl sulfate, applicants, in an embodiment, utilize an improvement to conventional quaternization processes. Dimethyl sulfate, a strong alkylating agent, is typically employed because of the excessively long reaction times encountered when weaker alkylating agents, such as methyl chloride, are employed. The quaternization reaction time can be significantly reduced, in many cases by 50% or more, if the esteramine mixture to be quatemized contains minimal amounts of triester component. By modifying esterification conditions, the amount of triesteramine component formed in the esteramine mixture may be minimized. Reducing the amount of triester component may lead to a significant reduction in quaternization reaction time. This allows one to utilize weaker alkylating agents, such as methyl chloride, which are less expensive and less toxic, without the disadvantage of excessively long reaction times. Further, the performance of the final product is in no way impaired and, in fact, an improvement in performance is typical. Similar improvements with other alkylating agents have been observed.

Triester formation in the esteramine mixture may be minimized by accelerating the heat up rate in the esterification reaction of fatty acids with alkanolamines. The accelerated heat up rate of greater than about 0.4° C./minute, in another embodiment, greater than about 0.8° C./minute, and in another embodiment, greater than about 1.25° C./minute, from a temperature of about 70° C. to a temperature in a range of from between 170° C. to 250° C., is effective in minimizing triester formation in the ester amine mixture.

The quaternization may be carried out in bulk or in solvent, at temperatures ranging from 60° to 120° C. If a solvent is employed, then the starting materials and/or product must be soluble in the solvent to the extent necessary for the reaction. Solvents of this type are generally known in the art. Suitable examples include polar solvents such as, for example, lower alcohols, e.g., $C_1$ to $C_6$ alcohols. Other solvents which, may be employed include, but are not limited to mono-, di-, and tri-glycerides, fatty acids, glycols and mixtures thereof.

In an embodiment, the quaternary ammonium salt includes a mixture of mono-(I), di-(II) and triester (III) components of the following formulae:

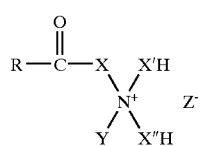

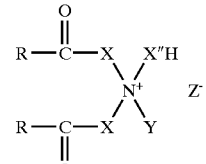

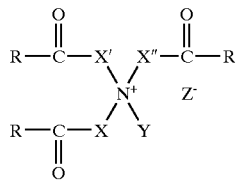

wherein:
X, X' and X" are the same or different and are selected from straight or branched chain, optionally substituted oxyalkylene or polyoxyalkylene groups having from 2 to 6 carbon atoms, in other embodiments, 3 to 6 carbon atoms, where the oxyalkylene units number from about 1 to 10, in other embodiments, 1 to 5, and in other embodiments, 1 to 2; each R group is individually selected from straight or branched chain, optionally substituted alkyl groups having from 11 to 23 carbon atoms, Y is an alkylphenyl group or a straight or branched chain optionally substituted $C_1$ to $C_6$ alkyl or alkylene group; and Z represents a softener compatible anion including, but not limited to, halogen, $CH_3SO_4$ or $C_2H_5SO_4$.

The reaction products may also include minor amounts of methyl trialkanolammonium salts and other impurities. The amount of diester in the final product (II) is generally greater than about 55% by weight and the amount of triester (III), based on the gas chromatograph of the ester amine, is generally less than about 25%, in other embodiments, less than 20% by weight based on the total amount of quaternary ammonium salt product.

In an embodiment, product compositions contemplate an ester distribution within the following ranges: greater than about 55 wt % diester and less than about 25 wt % triester, with a total fatty acid IV of from about 20 to about 90; in other embodiments, greater than about 60 wt % diester and less than about 20 wt % triester, with a total IV of from about 30 to about 70; and in still other embodiments, greater than about 62 wt % diester and less than about 17 wt % triester, with a total IV of from about 40 to about 60. In many instances, triester content will be in the 10.0 to 17.0 wt % range. In an embodiment, the IV is between about 45 to about 58.

In an embodiment, the ratio of cis to trans double bonds of the above salts is in the range of from about 80:20 to about 95:5. In other embodiments, the cis:trans ratio is greater than about 90:10. In some embodiments, the amount of trans isomer is in the range of from 5 to 9.5%.

There are several convenient methods for obtaining the desired cis:trans ratio of the quaternary ammonium salt product. One method is to produce the quaternary ammonium salt from cis-isomeric and trans-isomeric fatty acids after adjusting said acids to the desired ratio.

Another method is to produce the quaternary ammonium salt from the mixture after adjusting the ratio thereof by isomerizing a portion of the cis-isomeric fatty acid or ester thereof into the trans-isomer, in the presence of a metallic catalyst. Other methods are readily apparent to and well within the skill of one of ordinary skill in the art.

The quaternary ammonium compounds may generally be prepared by reacting at least one $C_{12}$ to $C_{22}$ fatty acid having a IV of from 20 to 90 with an alkanol amine in the presence of an acid catalyst. The ratio of acid to amine is, in one embodiment, in the range of 1.4 to 2.0, and the reaction is carried out at a temperature of from about 170° C. to about 250° C. until the reaction product has an acid value of below about 5. A heat up rate of at least about 0.8° C. per minute is employed in order to minimize triester formation. The esterification products are subsequently alkylated in order to obtain the quaternary ammonium product.

In another embodiment, the present invention contemplates a family of quaternary ammonium esters which are derived from ether alkanolamines. Said quaternary ammonium esters are of the general formula:

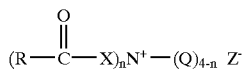

n is an integer of 1 or 2, R is a $C_5$ to $C_{23}$ straight or branched chain, optionally substituted alkyl group, each X can be the same or different and is selected from straight or branched chain, optionally substituted oxyalkylene or polyoxyalkylene groups having from 2 to 6 carbon atoms; each Q can be the same or different and is selected from a oxyalkylene or polyoxyalkylene group, or a straight or branched chain, optionally substituted alkyl, alkylene, alkylphenyl, hydroxyalkyl, hydroxyalkylene, wherein at least one of said Q groups is a $C_2$ to $C_6$ linear or branched chain oxyalkylene or polyoxyalkylene capped with a $C_6$ to $C_6$ alkyl, or an alkyl phenyl group; and Z is a compatible anion.

The above ester quat is generally prepared by reacting a fatty acid and/or fatty acid methyl ester as previously defined herein with an ether alkanolamine. The reaction is essentially the same as the reaction of said acid and/or said acid ester with an alkanolamine previously described herein, with an exception that the employment of a minimum heat up rate in order to achieve a high diester, low triester containing product is not necessary. The reaction of fatty acid or fatty acid methyl ester with an ether alkanolamine produces only mono- and di-substituted ester products. This is because the ether group is non-reactive and does not lead to the formation of a tri-substituted species. Accordingly, the heat up rate is less important when ether alkanolamines are employed as a reactant.

Further, employment of ether alkanolamines is beneficial in that they are more reactive with a broader range of alkylating agents, and the final products are easier to formulate and are more storage stable. Finally, controlling the ratio of fatty acid/fatty acid methyl ester to ether alkanolamine may control the ratio of mono- and di-substituted species.

In an embodiment, the preparation of a high diester quaternary ammonium mixture comprises reacting:

I) a $C_{11}$ to $C_{23}$ substituted or unsubstituted fatty acid or mixture of fatty acids having an Iodine Value of from about 20 to about 90, and having less than about 20% trans double bonds, with II) an ether alkanolamine of the formula:

wherein R is a $C_2$ to $C_6$ alkyl ether, and each of $R_1$ and $R_2$ is independently selected from $C_2$ to $C_6$ hydroxyalkyl groups, wherein the molar ratio of said fatty acid to ether alkanol amine is from about 1.4 to about 2.0, in other embodiments, from about 1.6 to 1.9, and quaternizing the resultant ester amine mixture in order to obtain an improved high diester quaternary ammonium mixture.

Ether alkanolamines are selected from the group consisting of methoxyethyldiethanolamine, methoxypropyldiethanolamine, methoxybutyldiethanolamine and mixtures thereof. The high diester quaternary ammonium mixture derived from ether alkanolamines in accordance with an embodiment generally has a diester content of at least 70 wt %, in other embodiments, greater than about 75 wt %, and in other embodiments, greater than about 80 wt % on a 100 wt % active basis.

Compositions having high diester content and low triester content demonstrate superior performance particularly in preparation of nanocomposites as compared to typical ester amine quaternary compounds.

In an embodiment, the smectite is a natural or synthetic clay mineral selected from the group consisting of hectorite, montmorillonite, bentonite, beidelite, saponite, stevensite and mixtures thereof. In an embodiment, the smectite is hectorite.

In an embodiment, for preparing the organoclay composition, the smectite mineral such as hectorite is crushed, ground, slurried in water and screened to remove grit and other impurities. In an embodiment, the smectite is converted to the sodium form if it is not already in this form. This may be effected, as known in the art, by a cation exchange reaction, or the clay may be converted via an aqueous reaction with a soluble sodium compound. The smectite mineral is then subjected as a dilute (1 to 6% solids) aqueous slurry to high shearing in a suitable mill. In an embodiment, this shearing uses a homogenizing mill of the type wherein high speed fluid shear of the slurry is effected by passing the slurry at high velocities through a narrow gap, across which a high pressure differential is maintained. This type of action can e.g. be effected in the well-known Manton-Gaulin ("MG") mill, which device is sometimes referred to as the "Gaulin homogenizer". Reference may be made to U.S. Pat. Nos. 4,664,842 and 5,110,501 (assigned to the assignee Southern Clay Products Inc.) for further details of such mill. The conditions for use of the MG mill may, in an embodiment, be substantially as in the said patents; e.g. the said pressure differential across the gap may be in the range of from 70,300 to 562,400 $g/cm^2$ with 140,600 to 351,550 $g/cm^2$ being more typical in representative operations.

Depending upon the specifics of the equipment, pressures higher than 562,400 $g/cm^2$ may readily be used. The slurry to be treated may be passed one or more times through the MG mill. Among additional instrumentalities, which may be effectively utilized to provide high shearing of the clay component, is the rotor and stator arrangement described in the assignee Southern Clay Products' U.S. Pat. No. 5,160,454. Following the high shear step, the slurry is intermixed with the quaternary ammonium salt and the reaction slurry may again be subjected to high shearing by one or more passes through the MG or other mentioned instrumentalities. The slurry is thereupon dewatered, and the quaternary ammonium-treated clay dried and ground to provide a dry organoclay product.

When used in composites such as nanocomposites, the organoclay compositions of the invention yield unexpected improvements in the mechanical and other properties of the composite, including with respect to tensile strength, tensile modulus and flex modulus, all of which are highly significant attributes for the plastics and similar formulations.

The organoclays may be used in preparing nanocomposites by any of the methods which are set forth in the prior referenced patents, and with a large variety of polymerizable resins such as polyamides, epoxy, polyvinyl, polyacrylamide, etc.

The invention will now be illustrated by examples, which are to be regarded as illustrative and not delimitative of the invention. Unless otherwise indicated to the contrary, all parts and percentages are by weight.

EXAMPLE 1

An organoclay composition was prepared from a smectite mineral clay which was processed as above described, i.e. crushed, ground, slurried in water and screened, converted to its sodium form, and then subjected to high shear by being passed as a dilute slurry through an MG mill, and then as a slurry treated with the quaternary ammonium compound in accordance with the invention. This quaternary composition was a diester quat in admixture with further quaternary ammonium compounds having esterified radicals, especially compounds having three esterified radicals (hereinafter "triester quats"); or compounds having a single esterified radical (hereinafter "monoester quats"). The reaction forming the organoclay was between the smectite clay and the quat mixture. The diester quat was present as greater than 55 wt % of the quaternary mixture; and the triester quat was present as less than 25 wt %, with the fatty acids corresponding to the esters in the mixture having a degree of unsaturation such that the iodine value "IV") is from about 20 to about 90. A wide angle x-ray scan pattern for the product resulting from the reaction is shown in FIG. 1, where the detected reflection intensity in counts/second is plotted against the D-spacing in Angstrom Units. The 001 reflection peak indicates a remarkably high $D_{001}$ spacing for the organoclay of 59.1Å, and suggests that the organoclay will exhibit a very high exfoliation efficiency in nanocomposites.

EXAMPLE 2

Figure 2:
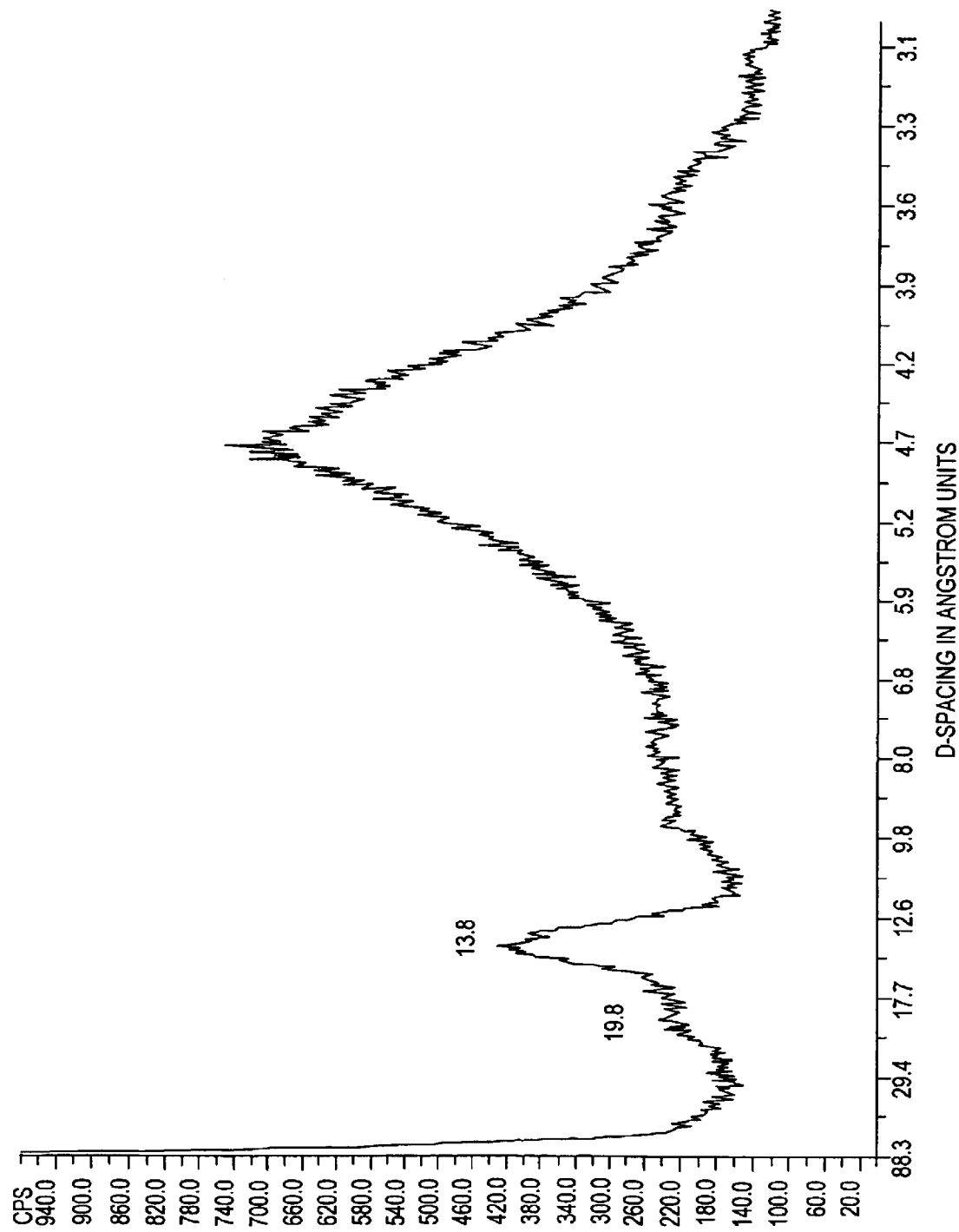
FIG. 2 is a wide angle X-ray scan pattern for a clay-polymer nanocomposite prepared using the organoclay depicted in FIG. 1.

5 wt % of the organoclay powder of Example 1 was premixed with high impact polystyrene ("HIPS") pellets by mechanical means. 50 to 60 g of this dry blend was added to a Brabender mixer which was then operated at 60 rpm. The temperature of the mixer was varied from 190° C. to 230° C. The time of melt blending in the mixer was varied from 15 minutes to one hour. At the end of the prescribed time, the molten mixture was extruded from the Brabender. The resulting nanocomposite sample was prepared for x-ray analysis by pressing the mixture in a Wabash press with the platens heated to 150° C. at a pressure of 7,500 to 10,000 p.s.i. for one minute. A 1-⅛" by 1-⅛" square was cut from the sample for analysis. The resulting wide angle x-ray scan pattern is shown in FIG. 2. The $D_{001}$ reflection peak of the organoclay is completely gone in this composite indicating very high exfoliation of the organoclay in the HIPS matrix.

EXAMPLE 3

Figure 3:
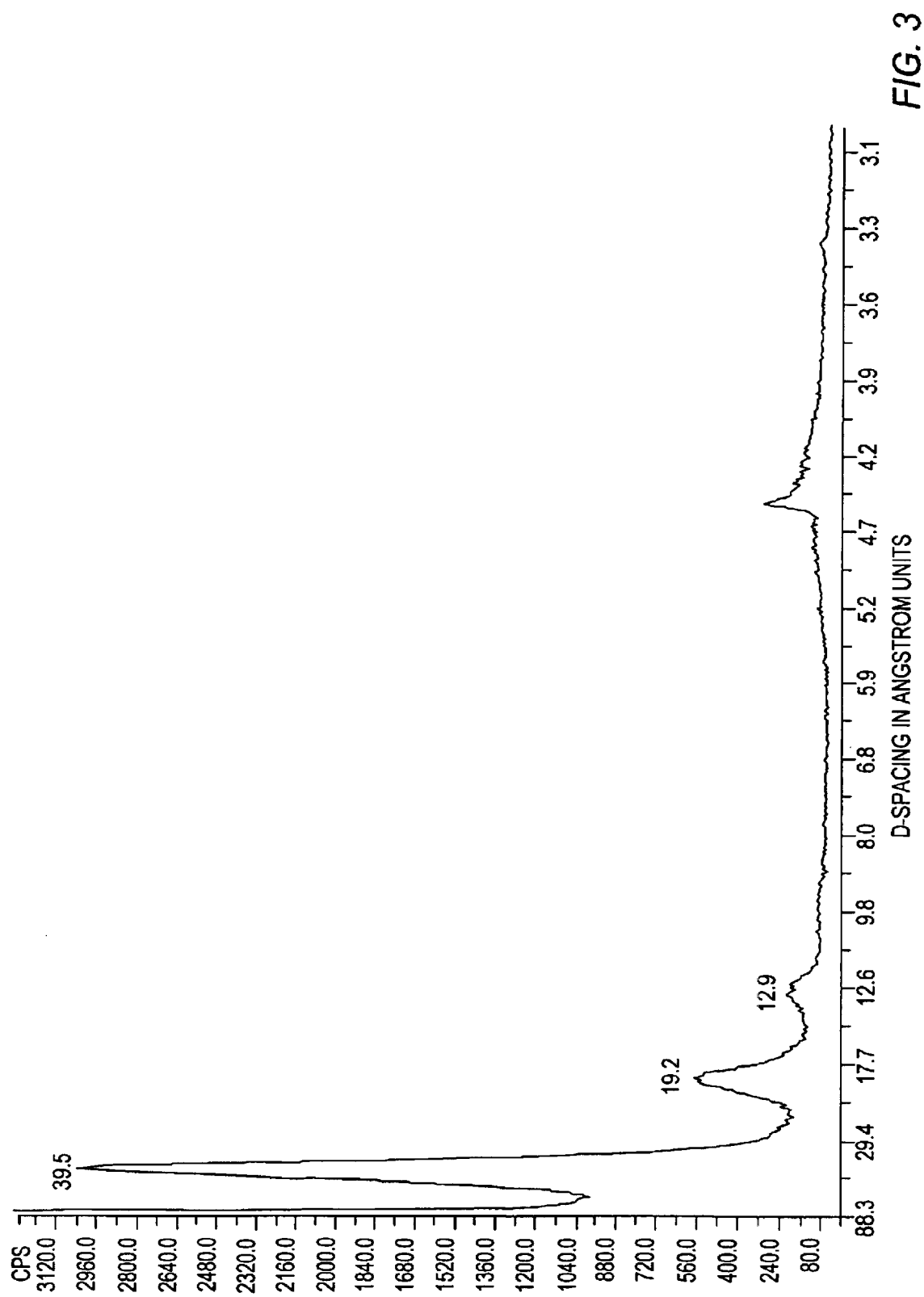
FIG. 3 is a wide angle X-ray scan pattern for a prior art ester quat-based organoclay.

In this Example an organoclay sample was prepared using the procedure of Example 1, except that in this instance the quat used was a diester quat (based on hydrogenated tallow), which in part differs from the quat used in Examples 1 and 2 in including methyl groups on the remaining two -N bonds, whereas the Example 1 quat includes a hydroxyethyl group on one of the said remaining -N bonds. A wide angle x-ray scan pattern for the product resulting from the reaction is shown in FIG. 3 . The 001 reflection peak indicates a $D_{001}$ spacing for the organoclay of 39.5 Å, which is not as high as the sample of Example 1, although still suggesting that the organoclay will exhibit a reasonably high exfoliation efficiency in nanocomposites.

EXAMPLE 4

Figure 4:
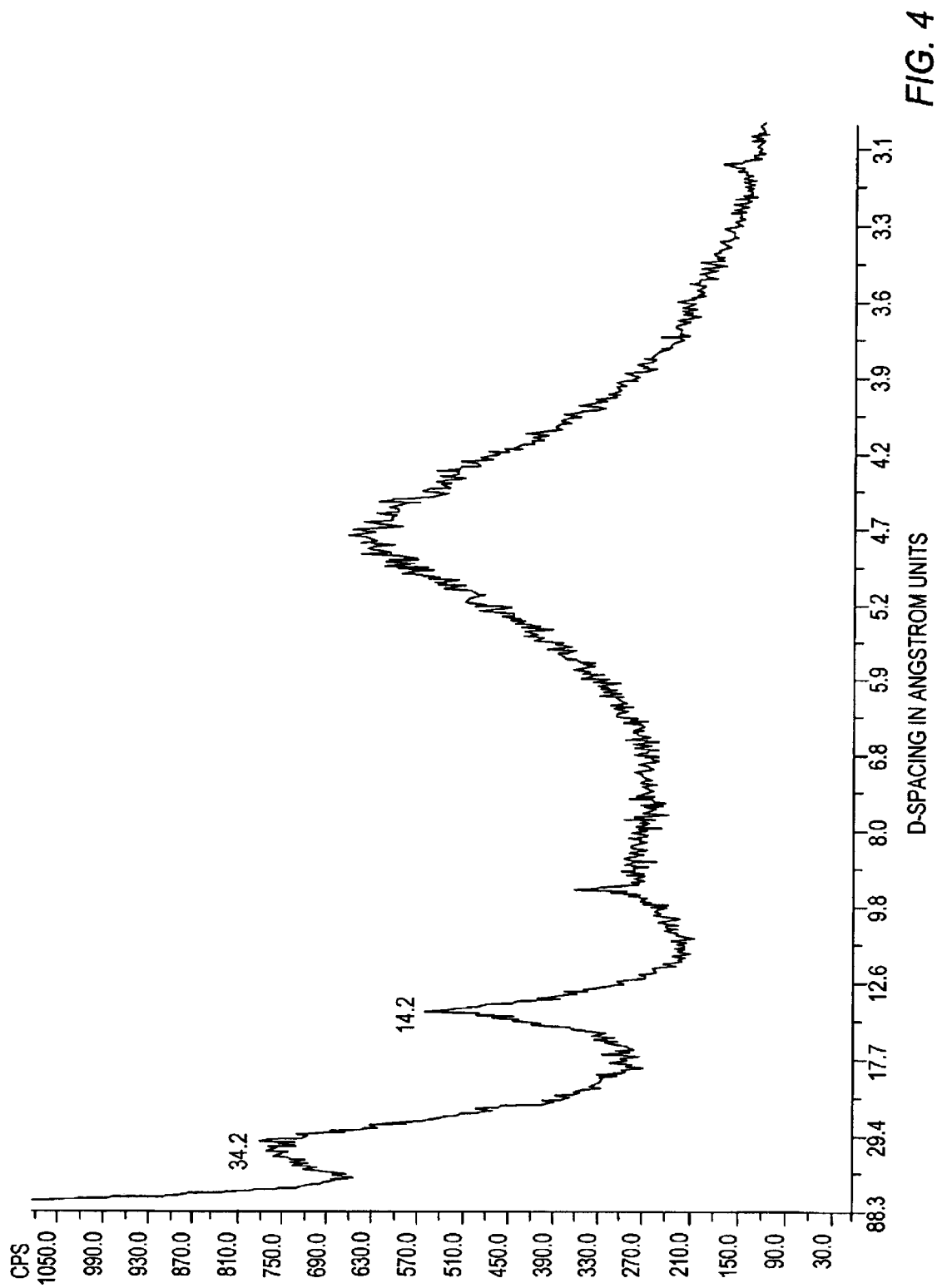
FIG. 4 is a wide angle X-ray scan pattern for a clay-polymer nanocomposite prepared using the organoclay the scan for which is depicted in FIG. 2.

The procedure of Example 2 was used in preparing a nanocomposite, with the organoclay being that prepared in Example 3. The wide angle x-ray scan of this nanocomposite is shown in FIG. 4. The $D_{001}$ reflection peak of the organoclay is completely gone in this composite indicating high exfoliation of the organoclay in the HIPS matrix. The peak in the curve marked as 34.2 is probably the 002 reflection. This would indicate a 00d spacing in the exfoliated clay of at least 70 Å.

EXAMPLE 5

Figure 5:
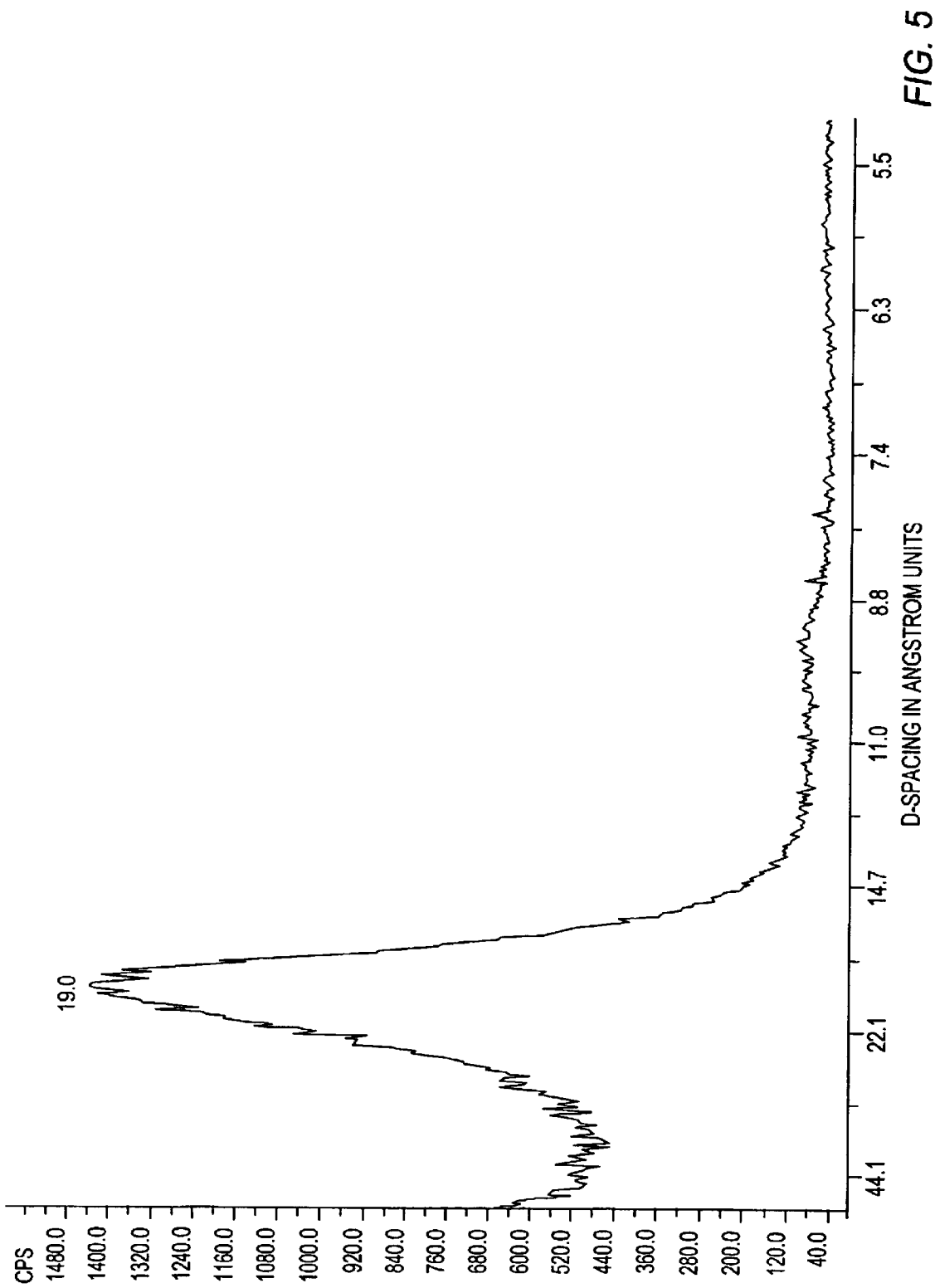
FIG. 5 is a wide angle X-ray scan pattern for a prior art quat-based organoclay, where the quat does not include esterified radicals.

In this Example an organoclay sample was prepared using the procedure of Example 1, except that the quat used was that disclosed for use in preparing the organoclays described in commonly assigned U.S. Pat. No. 5,739,087, the contents of which is hereby incorporated by reference. The said quat was a branched chain structure, and is not an ester quat. The corresponding wide angle x-ray appears in FIG. 5, from which it was seen that the 001 reflection peak indicates a $D_{001}$ spacing for the organoclay of 19.0 ÅA, which was lower than the sample of Example 1, and neither as high as the spacing of the sample in Example 3. This indicates that the organoclay exhibits a considerably lower exfoliation efficiency in nanocomposites.

EXAMPLE 6

Figure 6:
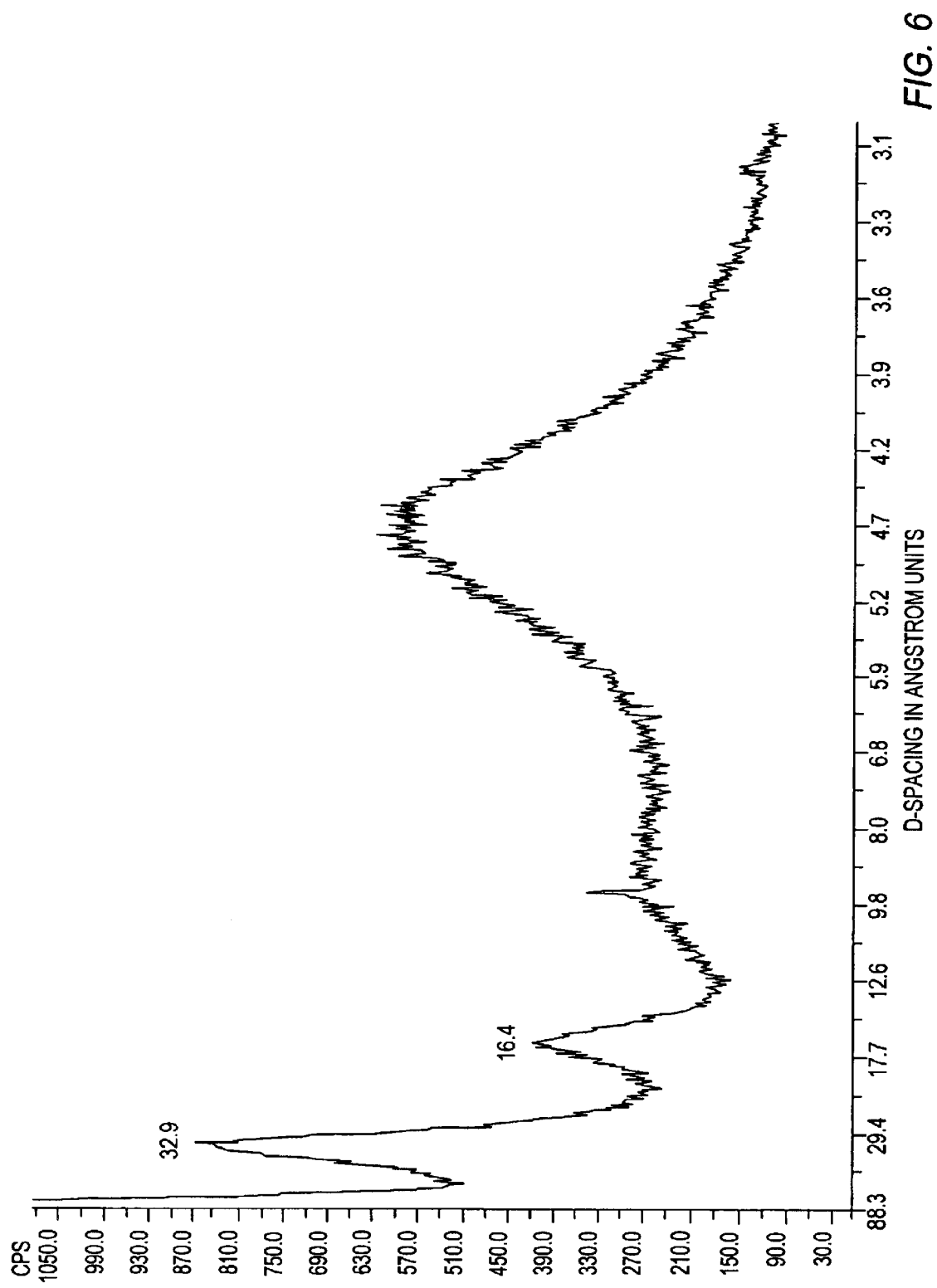
FIG. 6 is a wide angle X-ray scan pattern for a clay-polymer nanocomposite prepared using the organoclay the scan for which is depicted in FIG. 5.

The procedure of Example 2 was used in preparing a nanocomposite, with the organoclay being that prepared in Example 5. The wide angle x-ray scan of this nanocomposite is shown in FIG. 6. The 001 reflection peak of the organoclay is seen to appear in the scan of this composite and indicates an spacing of 32.9 ÅA, which compared especially to the results of Example 2 and to a lesser extent Example 4, indicates a relatively inadequate exfoliation of the organoclay in the HIPS matrix.

While the present invention has been described in terms of specific embodiments thereof, it will be understood in view of the present disclosure, that numerous variations upon the invention are now enabled to those skilled in the art, which variations yet reside within the scope of the present teaching. Accordingly, the invention is to be broadly construed, and limited only by the scope and spirit of the claims now appended hereto.

What is claimed is:

1. A clay-polymer nanocomposite comprising an organoclay which has been exfoliated into a polymer matrix, the organoclay being the reaction product of a smectite clay with a quaternary onium compound mixture, wherein the quaternary onium compound mixture comprises a diester quaternary ammonium compound mixed with an additional quaternary ammonium compound, wherein the additional quaternary ammonium compound comprises a triester quaternary ammonium compound, a monoester quaternary ammonium compound, or mixtures thereof.

2. The nanocomposite of claim 1, wherein the diester quaternary ammonium compound is present as greater than 55 wt. % of the quaternary onium compound mixture.

3. The nanocomposite of claim 1, wherein the additional quaternary ammonium compound is a triester quaternary ammonium compound and wherein the triester quaternary ammonium compound comprises less than 25 wt. % of the quaternary onium compound mixture.

4. The nanocomposite of claim 1, wherein the fatty acids corresponding to the esters of the diester quaternary ammonium compound and the additional quaternary ammonium compound have a degree of unsaturation such that the iodine value is from about 20 to about 90.

5. The nanocomposite of claim 1, wherein the additional quaternary ammonium compound is a triester quaternary ammonium compound, and wherein the diester quaternary ammonium compound comprises greater than 60 wt. % of the quaternary onium mixtures, the triester quaternary ammonium compound comprises less than 20 wt. % of the quaternary onium mixture, and wherein the fatty acids corresponding to the esters in the diester quaternary ammonium compound and the additional quaternary ammonium compound have a degree of unsaturation such that the iodine value is from about 30 to about 70.

6. The nanocomposite of claim 1, wherein the additional quaternary ammonium compound is a triester quaternary ammonium compound, and wherein the diester quaternary ammonium compound comprises greater than 62 wt. % of the quaternary onium mixture, the triester quaternary ammonium compound comprises less than 17 wt. % of the quaternary onium mixture and wherein the fatty acids corresponding to the esters in the diester quaternary ammonium compound, and wherein the additional quaternary ammonium compound have a degree of unsaturation such that the iodine value is from about 40 to about 60.

7. The nanocomposite of claim 1, wherein the additional quaternary ammonium compound is a triester quaternary ammonium compound and wherein the diester quaternary ammonium compound comprises greater than 62 wt. % of the quaternary onium mixture, the triester quaternary ammonium compound comprises less than 17 wt. % of the quaternary onium mixture, and wherein the fatty acids corresponding to the esters in the diester quaternary ammonium compound and the additional quaternary ammonium compound have a degree of unsaturation such that the iodine value of the fatty acids is from about 45 to about 58.

8. The nanocomposite of claim 1, wherein the diester quaternary ammonium compound, triester quaternary ammonium compound, and monoester quaternary ammonium compound, are the reaction products of $C_{12}$–$C_{22}$ fatty acids or the hydrogenation products thereof, or a mixture of such acids, with an alkanolamine in the presence of an acid catalyst wherein the ratio of fatty acids to alkanolamine is from about 1.40 to about 2.0.

9. An organoclay comprising the reaction product of a smectite clay with a quaternary onium compound mixture wherein the quaternary onium compound mixture comprises a diester quaternary ammonium compound mixed with an additional quaternary ammonium compound, wherein the additional quaternary ammonium compound comprises a triester quaternary ammonium compound, a monoester quaternary ammonium compound, or mixtures thereof.

10. The organoclay composition of claim 9, wherein the diester quaternary compound comprises greater than 55 wt. % of the quaternary mixture.

11. The organoclay composition of claim 10, wherein the additional quaternary ammonium compound is a triester quaternary ammonium compound, and wherein the triester quaternary ammonium compound comprises less than 25 wt % of the quaternary onium mixture.

12. The organoclay composition of claim 9, wherein the fatty acids corresponding to the esters in the diester quaternary ammonium compound and the additional quaternary ammonium compound have a degree of unsaturation such that the iodine value is from about 20 to about 90.

13. The organoclay composition of claim 9, wherein the additional quaternary ammonium compound is a triester quaternary ammonium compound, and wherein the diester quaternary ammonium compound comprises greater than 60 wt. % of the quaternary onium mixture, the triester quaternary ammonium compound comprises less than 20 wt. % of the quaternary onium mixture, and wherein the fatty acids corresponding to the esters in the diester quaternary ammonium compound and the additional quaternary ammonium compound have a degree of unsaturation such that the iodine value is from about 30 to about 70.

14. The organoclay composition of claim 9, wherein the additional quaternary ammonium compound is a triester quaternary ammonium compound, and wherein the diester quaternary ammonium compound comprises greater than 62 wt. % of the quaternary onium mixture, the triester quaternary ammonium compound comprises less than 17 wt. % of the quaternary onium mixture, and wherein the fatty acids corresponding to the esters in the diester quaternary ammonium compound and the additional quaternary ammonium compound have a degree of unsaturation such that the iodine value is from about 40 to about 60.

15. The organoclay composition of claim 9, wherein the fatty acids corresponding to the esters of the diester quaternary ammonium compound and the additional quaternary ammonium have a degree of unsaturation such that the iodine value is from about 45 to about 58.

16. The organoclay composition of claim 9, wherein the smectite is selected from the group consisting of hectorite, montmorillonite, bentonite, beidellite, saponite, stevensite and mixtures thereof.

17. The organoclay composition of claim 16, wherein the smectite comprises hectorite.

18. The organoclay of claim 9, wherein the diester quaternary ammonium compound, triester quaternary ammonium compound, and monoester quaternary ammonium compound, are the reaction products of $C_{12}$–$C_{22}$ fatty acids or the hydrogenation products thereof, or a mixture of such acids, with an alkanolamine in the presence of an acid catalyst wherein the ratio of fatty acids to alkanolamine is from about 1.40 to about 2.0.

19. A method for preparing a nanocomposite comprising:
contacting a smectite clay with a quaternary onium compound mixture comprising a diester quaternary ammonium compound mixed with an additional quaternary ammonium compound, wherein the additional quaternary ammonium compound comprises a triester quaternary ammonium compound, a monoester quaternary ammonium compound, or mixtures thereof; and
intermixing an organoclay with a polymer matrix.

20. The nanocomposite of claim 19, wherein the diester quaternary ammonium compound comprises greater than 55 wt. % of the quaternary onium compound mixture.

21. The nanocomposite of claim 19, wherein the additional quaternary ammonium compound is a triester quaternary ammonium compound and wherein the triester quaternary ammonium compound comprises less than 25 wt. % of the quaternary onium compound mixture.

22. The nanocomposite of claim 19, wherein the fatty acids corresponding to the esters of the diester quaternary ammonium compound and the additional quaternary ammonium compound have a degree of unsaturation such that the iodine value is from about 20 to about 90.

23. The nanocomposite of claim 19, wherein the additional quaternary ammonium compound is a triester quaternary ammonium compound, and wherein the diester quaternary ammonium compound comprises greater than 60 wt. % of the quaternary onium mixture, the triester quaternary ammonium compound comprises less than 20 wt. % of the quaternary onium mixture, and wherein the fatty acids corresponding to the esters in the diester quaternary ammonium compound and the additional quaternary ammonium compound have a degree of unsaturation such that the iodine value is from about 30 to about 70.

24. The nanocomposite of claim 19, wherein the additional quaternary ammonium compound is a triester quaternary ammonium compound, and wherein the diester quaternary ammonium compound comprises greater than 62 wt. % of the quaternary onium mixture, the triester quaternary ammonium compound comprises less than 17 wt. % of the quaternary onium mixture, and wherein the fatty acids corresponding to the esters in the diester quaternary ammonium compound and the additional quaternary ammonium compound have a degree of unsaturation such that the iodine value is from about 40 to about 60.

25. The nanocomposite of claim 19, wherein the additional quaternary ammonium compound is a triester quaternary ammonium compound, and wherein the diester quaternary ammonium compound comprises greater than 62 wt. % of the quaternary onium mixture, the triester quaternary ammonium compound comprises less than 17 wt. % of the quaternary onium mixture, and wherein the fatty acids corresponding to the esters in the diester quaternary ammonium compound and the additional quaternary ammonium compound have a degree of unsaturation such that the iodine value is from about 48 to about 58.

26. The nanocomposite of claim 19, wherein the smectite clay is further subjected to a shearing treatment.

27. The nanocomposite of claim 19, wherein the organoclay is further subjected to shearing.

28. The method of claim 19, wherein intermixing the organoclay with the polymer matrix further comprises extruding the organoclay with the polymer matrix.

29. The nanocomposite of claim 19, wherein the diester quaternary ammonium compound, triester quaternary ammonium compound, and monoester quaternary ammonium compound, are the reaction products of $C_{12}$–$C_{22}$ fatty acids or the hydrogenation products thereof, or a mixture of such acids, with an alkanolamine in the presence of an acid catalyst wherein the ratio of fatty acids to alkanolamine is from about 1.40 to about 2.0.

30. A nanocomposite comprising an organoclay which has been exfoliated into a polymer matrix, the organoclay being a reaction product of a smectite clay with a quaternary ammonium component, wherein the quaternary ammonium component is prepared by a method comprising:

mixing at a temperature of about 70° C. a $C_{12}$–$C_{22}$ fatty acid or mixture of fatty acids having an iodine-value of from about 3 to about 90, with an alkanolamine of the formula:

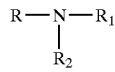

wherein R, $R_1$ and $R_2$ are independently selected from $C_2$–$C_6$ hydroxyalkyl groups, and wherein the molar ratio of the fatty acid to the alkanolamine is from about 1.4 to about 2.0, increasing the temperature of the mixture of the fatty acid and the alkanolamine from 70 ° C. to a range of from 170° C. to 250° C., wherein the rate of temperature increase is maintained at an average rate of greater than about 0.4° C. per minute to produce a mixture of about 55 wt % of a diester compound and less than 25 wt % of a triester compound; and alkylating the produced diester and triester compounds with an alkylating agent to form the quaternary ammonium component.

31. The nanocomposite of claim 30, wherein the rate of temperature increase is maintained at an average rate greater than 0.8° C. per minute.

32. The nanocomposite of claim 30, wherein the fatty acid is a $C_{16}$–$C_{22}$ fatty acid having an iodine value of from about 40 to about 60.

33. The nanocomposite of claim 30, wherein the fatty acid is a $C_{16}$–$C_{22}$ fatty acid having an iodine value of from about 45 to about 55.

34. The nanocomposite of claim 30, wherein the fatty acid is tallow, soy, palm, palm kernel, rape seed, canola, tall oil, lard or mixtures thereof.

35. The nanocomposite of claim 30, wherein the alkanolamine is selected from the group consisting of triethanolamine, propanol diethanolamine, ethanol diisopropanolamine, triisopropanol amine, diethanolisopropanol amine, ethanoldiisobutanolamine, diethanolisobutanolamine and mixtures thereof.

36. The nanocomposite of claim 30, wherein the molar ratio of the fatty acid to the alkanolamine is in the range of from about 1.60 to about 1.90.

37. The nanocomposite of claim 30, wherein the molar ratio of the fatty acid to the alkanolamine is in the range of from about 1.68 to about 1.72.

38. The nanocomposite of claim 30, wherein the fatty acid has less than 10% trans isomer.

39. The nanocomposite of claim 30, wherein the alkylating agent is selected from the group consisting of methyl chloride, benzyl chloride, ethyl chloride, diethyl sulfate, dimethyl carbonate, trimethyl phosphate, dimethyl sulfate and mixtures thereof.

40. A nanocomposite comprising an organoclay which has been exfoliated into a polymer matrix, the organoclay being the reaction product of a smectite clay with a quaternary ammonium component, the quaternary ammonium component comprising a monoester compound of formula (I), a diester compound of formula (II), and a triester compound of formula (III):

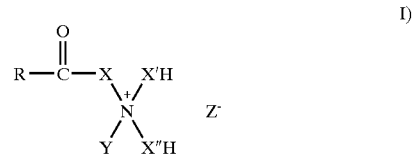

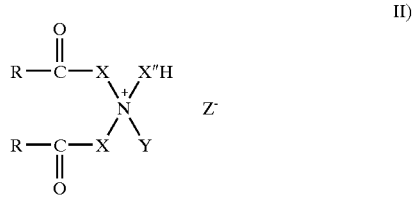

-continued

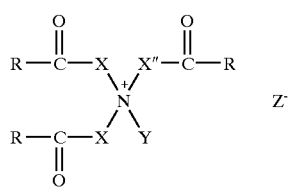
(III)

wherein X, X' and X" are the same or different and are selected from straight or branched chain, oxyalkylene or polyoxyalkylene groups having from 2–6 carbon atoms where the oxyalkylene units number from about 1–10, each R group is individually selected from straight or branched chain alkyl or alkylene groups having from 11 to 23 carbon atoms, Y is and alkylphenyl group or a straight or branched chain $C_1$ to $C_6$ alkyl or alkylene group; and Z– represents a halogen or sulfate;

wherein the diester compound comprises greater than 55 wt. % of the quaternary ammonium component and wherein the triester compound comprises less than 25 wt. % of the quaternary ammonium component.

41. A nanocomposite comprising an organoclay which has been exfoliated into a polymer matrix, the organoclay being the reaction product of a smectite clay with a quaternary ammonium component, the quaternary ammonium component comprising one or more compounds having the general formula (IV):

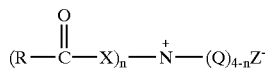

wherein n is an integer from 1 to 2, R is a $C_5$ to $C_{23}$ straight or branched chain alkyl or alkylene group, each X can be the same or different and is selected from straight or branched chain oxyalkylene or polyoxyalkylene groups having from 2–6 carbon atoms; each Q can be the same or different and is selected from a oxyalkylene or polyoxyalkylene group, or straight or branched chain alkyl, alkylene, alkyl phenyl, hydroxyalkyl, or hydroxyalkylene group, wherein at least one of the Q groups is a $C_2$ to $C_6$ linear or branched chain oxyalkylene or polyoxyalkylene capped with a $C_1$ to $C_6$ alkyl, or an alkyl phenyl group; and $Z^-$ is a halogen or sulfate.

42. The nanocomposite of claim 41, wherein the quaternary ammonium component comprises a diester quaternary ammonium compound and a monoester quaternary ammonium compound, and wherein the diester quaternary ammonium compound comprises at least 70% by weight of the quaternary ammonium component.

43. A nanocomposite comprising an organoclay which has been exfoliated into a polymer matrix, the organoclay being the reaction product of a smectite clay with a quaternary ammonium component, wherein the quaternary ammonium component is prepared by a method comprising:

reacting a $C_{11}$–$C_{23}$ fatty acid or mixture of fatty acids having an iodine value of from about 20 to about 90, with an ether alkanolamine of the formula:

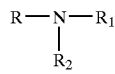

wherein R is a $C_2$–$C_6$ alkyl ether, and each of $R_1$ and $R_2$ is independently selected from $C_2$–$C_6$ hydroxyalkyl groups, and wherein the molar ratio of the fatty acid to the ether alkanolamine is from about 1.4 to about 2.0; and alkylating the product of the reaction of the fatty acid with the ether alkanolamine with an alkylating agent to form the quaternary ammonium component.

44. The nanocomposite of claim 43, wherein the fatty acid is a $C_{16}$–$C_{22}$ fatty acid having an iodine value of from about 40 to about 60.

45. The nanocomposite of claim 43, wherein the fatty acid is tallow, soy, palm, palm kernel, rape seed, canola, tall oil, lard or mixtures thereof.

46. The nanocomposite of claim 43, wherein the ether alkanolamine is selected from the group consisting of methoxyethyldiethanolamine, methoxypropyldiethanolamine, methoxybutyldiethanolamine and mixtures thereof.

47. The nanocomposite of claim 43, wherein the molar ratio of fatty acid to ether alkanolamine is in the range of from about 1.60 to about 1.90.

48. The nanocomposite of claim 43, wherein the alkylating agent is selected from the group consisting of methyl chloride, benzyl chloride, ethyl chloride, diethyl sulfate, dimethyl carbonate, trimethyl phosphate, dimethyl sulfate or mixtures thereof.

49. The nanocomposite of claim 43, wherein the alkylating agent is methyl chloride.

50. The nanocomposite of claim 43, wherein the process is conducted in the presence of a solvent.

51. The nanocomposite of claim 43, wherein the process is conducted in the presence of a solvent, wherein the solvent is selected from the group consisting of $C_1$–$C_6$ alcohols, glycols, fatty acid, mono-, di-, or tri-glycerides, and mixtures thereof.

52. The nanocomposite of claim 43, wherein the fatty acid has less than 20% trans isomer.

53. The nanocomposite of claim 43, wherein the alkyl ether is selected from a group consisting of, methoxyethyl ether, methoxypropyl ether, methoxybutyl ether and mixtures thereof.

54. The nanocomposite of claim 43, wherein the hydroxyalkyl group is selected from a group consisting of ethanol, propanol, isopropanol, isobutanol and mixtures thereof.

55. An organoclay comprising a reaction product of a smectite clay with a quaternary ammonium component, the quaternary ammonium component comprising a monoester compound of formula (I), a diester compound of formula (II), and a triester compound of formula (III):

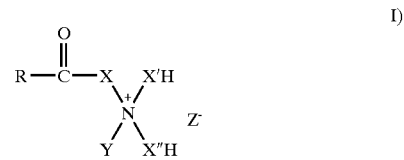
I)

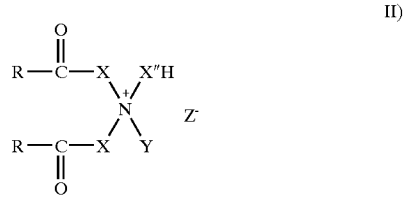
II)

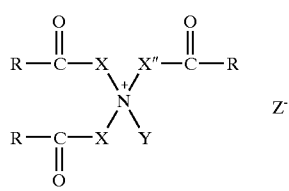

(III)

wherein X, X' and X" are the same or different and are selected from straight or branched chain oxyalkylene or polyoxyalkylene groups having from 2–6 carbon atoms, where the oxyalkylene units number from about 1–10, each R group is individually selected from straight or branched chain alkyl or alkylene groups having from 11 to 23 carbon atoms, Y is and alkylphenyl group or a straight or branched chain $C_1$ to $C_6$ alkyl or alkylene group; and Z– represents a halogen or sulfate;

wherein the diester compound comprises greater than 55 wt. % of the quaternary ammonium component and wherein the triester compound comprises less than 25 wt. % of the quaternary ammonium component.

56. An organoclay comprising the reaction product of a smectite clay with a quaternary ammonium component, the quaternary ammonium component comprising one or more compounds having the general formula (IV):

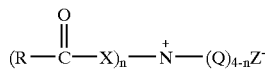

wherein n is an integer from 1 to 2, R is a $C_5$ to $C_{23}$ straight or branched chain alkyl or alkylene group, each X can be the same or different and is selected from straight or branched chain oxyalkylene or polyoxyalkylene groups having from 2–6 carbon atoms; each Q can be the same or different and is selected from a oxyalkylene or polyoxyalkylene group, or straight or branched chain alkyl, alkylene, alkyl phenyl, hydroxyalkyl, or hydroxyalkylene group, wherein at least one of the Q groups is a $C_2$ to $C_6$ linear or branched chain oxyalkylene or polyoxyalkylene capped with a $C_1$ to $C_6$ alkyl, or an alkyl phenyl group; and $Z^-$ is a halogen or sulfate.

57. The organoclay of claim 56, wherein the quaternary ammonium component comprises a diester quaternary ammonium compound and a monoester quaternary ammonium compound, and wherein the diester quaternary ammonium compound comprises at least about 70% by weight of the quaternary ammonium component.

58. The organoclay of claim 56, wherein the alkyl ether is selected from a group consisting of, methoxyethyl ether, methoxypropyl ether, methoxybutyl ether and mixtures thereof.

59. The organoclay of claim 56, wherein the fatty acid has less than 20% trans isomer.

60. The organoclay of claim 56, wherein the hydroxyalkyl group is selected from a group consisting of ethanol, propanol, isopropanol, isobutanol and mixtures thereof.

* * * * *